United States Patent [19]
Liebmann et al.

[11] Patent Number: 5,923,562
[45] Date of Patent: Jul. 13, 1999

[54] METHOD FOR AUTOMATICALLY ELIMINATING THREE WAY INTERSECTION DESIGN CONFLICTS IN PHASE EDGE, PHASE SHIFT DESIGNS

[75] Inventors: Lars W. Liebmann; Robert Thomas Sayah, both of Dutchess County, N.Y.

[73] Assignee: International Business Machines Corporation, Armonk, N.Y.

[21] Appl. No.: 08/733,584

[22] Filed: Oct. 18, 1996

[51] Int. Cl.[6] ............................. G06F 17/00; G06F 17/50
[52] U.S. Cl. ................................ 364/488; 364/489; 430/5
[58] Field of Search .................................. 364/488–491; 395/500; 430/5, 312–314

[56] References Cited

U.S. PATENT DOCUMENTS

| | | | |
|---|---|---|---|
| 5,018,074 | 5/1991 | Griffith et al. | 464/490 |
| 5,326,659 | 7/1994 | Liu et al. | 430/5 |
| 5,411,823 | 5/1995 | Okamoto | 430/5 |
| 5,415,952 | 5/1995 | Haruki et al. | 430/5 |
| 5,436,095 | 7/1995 | Mizuno et al. | 430/5 |
| 5,468,578 | 11/1995 | Rolfson | 430/5 |
| 5,487,962 | 1/1996 | Rolfson | 430/5 |
| 5,537,648 | 7/1996 | Liebmann et al. | 395/500 |
| 5,538,833 | 7/1996 | Ferguson et al. | 430/325 |
| 5,553,274 | 9/1996 | Liebmann | 395/500 |
| 5,576,126 | 11/1996 | Rolfson | 430/5 |
| 5,609,813 | 3/1997 | Allison et al. | 264/401 |
| 5,636,131 | 6/1997 | Liebmann et al. | 364/490 |
| 5,670,281 | 9/1997 | Dai | 430/5 |
| 5,671,152 | 9/1997 | Lavin et al. | 364/490 |
| 5,672,450 | 9/1997 | Rolfson | 430/5 |

FOREIGN PATENT DOCUMENTS 5-107726  4/1993  Japan .

OTHER PUBLICATIONS

Levenson, Marc, Extending the Lifetime of Optical Lithography Technologies with Wavefront Engineering, Dec. 1994, Jpn J. Appl. Phys. vol. 33 (1994) pp. 6765–6772.

Waas, T., et al., Automatic Generation of Phase Shift Mask Layouts; 1994; Microelectronic Engineering 23, pp. 139–142.

*Primary Examiner*—Kevin J. Teska
*Assistant Examiner*—Vuthe Siek
*Attorney, Agent, or Firm*—Whitham, Curtis & Whitham; H. Daniel Schnurmann

[57] ABSTRACT

A method automatically locates and eliminates the most frequently encountered phase conflict in phase edge phase shift mask (PSM) designs used in the manufacture of VLSI circuits. The process is implemented as an automatic CAD routine that locates and widens one leg of a three way intersection to avoid phase conflicts. CAD and design rule checking techniques are used to first locate and then to resolve design conflicts prior to actually executing the very time consuming phase shift mask design. The original circuit design is manipulated prior to or as part of the design rule checking, allowing the verification of the manipulations made prior to handing the design off to the mask layout and mask data preparation group.

11 Claims, 18 Drawing Sheets

METHOD FOR AUTOMATICALLY ELIMINATING THREE WAY INTERSECTION DESIGN CONFLICTS IN PHASE EDGE, PHASE SHIFT DESIGNS

CROSS-REFERENCE TO RELATED APPLICATION

The subject matter of this invention is related to that in copending application Ser. No. 08/290,625 filed Aug. 15, 1994, by Lars W. Liebmann, Mark A. Lavin, and Pia N. Sanda for "Geometric Autogeneration of 'Hard' Phase-shift Designs for VLSI", assigned to a common assignee with this application. The disclosure of application Ser. No. 08/290,625 is incorporated herein by reference.

BACKGROUND OF THE INVENTION

1. Field of the Invention

The present invention generally relates to the manufacture of very large scale integrated (VLSI) circuits and, more particularly, to the resolution enhancement of photolithographic images through the use of phase shifted masks. More specifically, a method is provided to eliminate the most frequent type of design conflict in phase edge phase shifted masks.

2. Description of the Related Art

A very large scale integrated (VLSI) complementary metal oxide semiconductor (CMOS) chip is manufactured on a silicon wafer by a sequence of material additions (i.e., low pressure chemical vapor depositions, sputtering operations, etc.), material removals (i.e., wet etches, reactive ion etches, etc.), and material modifications (i.e., oxidations, ion implants, etc.). These physical and chemical operations interact with the entire wafer. For example, if a wafer is placed into an acid bath, the entire surface of the wafer will be etched away. In order to build very small electrically active devices on the wafer, the impact of these operations has to be confined to small, well defined regions.

Lithography in the context of VLSI manufacturing of CMOS devices is the process of patterning openings in photosensitive polymers (sometimes referred to as photoresists or resists) which define small areas in which the silicon base material is modified by a specific operation in a sequence of processing steps. The manufacturing of CMOS chips involves the repeated patterning of photoresist, followed by an etch, implant, deposition, or other operation, and ending in the removal of the expended photoresist to make way for a new resist to be applied for another iteration of this process sequence.

The basic lithography system consists of a light source, a stencil or photomask containing the pattern to be transferred to the wafer, a collection of lenses, and a means for aligning existing patterns on the wafer with patterns on the mask. Since a wafer containing from fifty to one hundred chips is patterned in steps of one to four chips at a time, these lithography tools are commonly referred to as steppers. The resolution of an optical projection system such as a lithography stepper is limited by parameters described in Rayleigh's equation:

$$R = k_1 \lambda / NA, \qquad (1)$$

where $\lambda$ is the wavelength (in $\mu$m) of the light source used in the projection system and NA is the numerical aperture of the projection optics used. $k_1$ is a factor describing how well a combined lithography system can utilize the theoretical resolution limit in practice and it can range from 0.8 down to 0.5 for standard exposure systems. R is the resolution value for the optical projection system. The highest resolution in optical lithography is currently achieved with deep ultra violet (DUV) steppers operating at 248 nm wavelengths but mid ultra violet (MUV) steppers with a wavelength of 356 nm are also in widespread use.

Conventional photomasks consists of chromium patterns on a quartz plate, allowing light to pass wherever the chromium is removed from the mask. Light of a specific wavelength is projected through the mask onto the photoresist coated wafer, exposing the resist wherever hole patterns are placed on the mask. Exposing the resist to light of the appropriate wavelength causes modifications in the molecular structure of the resist polymers which allows developer to dissolve and remove the resist in the exposed areas. Negative resist systems allow only unexposed resist to be developed away. The photomask, when illuminated, can be pictured as an array of individual, infinitely small light sources which can be either turned on (points in clear areas) or turned off (points covered by chrome). If the amplitude of the electric field vector which describes the light radiated by these individual light sources is mapped across a cross section of the mask, a step function will be plotted reflecting the two possible states that each point on the mask can be found in (light on, light off).

These conventional photomasks are commonly referred to as chrome on glass (COG) binary masks, due to the binary nature of the image amplitude. The perfectly square step function exists only in the theoretical limit of the exact mask plane. At any distance away from the mask, such as in the wafer plane, diffraction effects will cause images to exhibit a finite image slope. At small dimensions, that is, when the size and spacing of the images to be printed are small relative to the $\lambda$/NA (NA being the numerical aperture of the exposure system), electric field vectors of adjacent images will interact and add constructively. The resulting light intensity curve between the features is not completely dark, but exhibits significant amounts of light intensity created by the interaction of adjacent features. The resolution of an exposure system is limited by the contrast of the projected image, that is the intensity difference between adjacent light and dark features. An increase in the light intensity in nominally dark regions will eventually cause adjacent features to print as one combined structure rather than discrete images.

The quality with which small images can be replicated in lithography depends largely on the available process latitude; that is, the amount of allowable dose and focus variation that still results in correct image size. Phase shifted mask (PSM) lithography improves the lithographic process latitude or allows operation of a lower $k_1$ value (see equation 1) by introducing a third parameter on the mask. The electric field vector, like any vector quantity, has a magnitude and direction, so in addition to turning the electric field amplitude on and off, it can be turned on with a 0° phase or turned on with a 180° phase. This phase variation is achieved in PSMs by modifying the length that a light beam travels through the mask material. By recessing the mask by the appropriate depth, light traversing the thinner portion of the mask and light traversing the thicker portion of the mask will be 180° out of phase; that is, their electric field vectors will be of equal magnitude but point in exactly opposite directions so that any interaction between these light beams results in perfect cancellation. For more information on PSM, the reader is referred to "Phase-Shifting Mask Strategies: Isolated Dark Lines", Marc D. Levenson, *Microlithography World*, March/April 1992, pp. 6–12.

The limits of PSM lithography can be uniquely challenged by the manufacture of high-performance logic derivatives of advanced Dynamic Random Access Memory (DRAM) technologies. These technologies are entering development cycles with immediate requirements for sub-quarter micron printed gate lengths and tight dimensional control on the gate structures across large chip areas. Since these logic technologies are based on shrinking the gate length in an established DRAM technology, the overall layout pitch remains constant for all critical mask levels, resulting in narrow, optically isolated lines on the scaled gate level. The requirement for tight line width control on narrow isolated lines drives the requirement of phase edge PSMs for these logic applications.

Phase edge PSM lithography makes use of contrast enhancement caused by a phase transition under an opaque feature on a mask. This phase transition is achieved by etching an appropriate depth into the quartz mask substrate on one side of a narrow line structure on the mask. Not all narrow line structures on the mask close upon themselves, some edges of the etched region will terminate in bare quartz regions. Since the 180° phase transition forces a minimum in the image intensity, narrow dark lines will be printed by these excess phase edges. Currently, the unwanted images are erased using a trim mask, a second mask that transmits light only in regions left unexposed by the residual phase edge.

Even though resolution enhancement through the use of hard phase shifted masks (frequency doubling masks) has been extensively proven, implementation of this technique is critically dependent on computer assisted design (CAD) technology that can modify existing circuit designs to incorporate the additional design levels needed to build a phase shifted mask. Design modifications consist of defining regions on the mask that require phase shifting (i.e., by etching into the mask substrate) relative to the rest of the mask, and of designs added to eliminate lines printed by unwanted phase edges. The basic concept of creating a phase transition across any small feature is easily realized and can be done, given sufficient time, on a graphics terminal by hand. The challenge that needs to be met before introducing hard phase shifters to VLSI product programs lies in the rapid, reliable design modifications of complex chip designs. No manufacturable CAD system exists that can efficiently translate phase shift design rules into regions that need phase assignment, as is necessary for all light field design levels such as the gate level, typically one of the most critical levels for line width control.

It is well known to those skilled in the art of phase edge lithography that three way intersections at minimum dimension cannot be phase shifted; i.e., the three rectangular shapes forming the background behind three lines, all at a width narrow enough to require phase shifting, join at a common node and cannot be colored with only two colors while requiring a color change across each segment of the intersection.

Unfortunately, many widely used basic CMOS circuit components, such as inverters, require a poly wire to run from one input of two MOSFETs, thereby creating a three way intersection. Fortunately, the resulting three way intersection occurs in poly wiring, not in active poly gates, allowing slight modifications in the design to avoid the conflict in the phase assignment without impacting the circuit performance.

Two design modifications, both targeted at eliminating the three way intersection at minimum dimension, are possible. First, the three way intersection can be turned into a four way intersection with one sacrificial leg that will be eliminated in the trim process. Second, the three way intersection can be converted into a two way intersection by widening one leg to the point where phase shifting is no longer required. The first technique is usually less desirable due to space constraints. The second technique works well but is extremely time consuming if implemented manually in an existing design. Changing design rules to force the widened leg in three way intersections from the start would seriously impede the migration of existing designs and design libraries to ground rules where phase edge PSM is necessary.

The present invention relates to the automatic elimination of three way, or "T", intersections in the original CAD layout.

SUMMARY OF THE INVENTION

It is therefore an object of the present invention to provide a method to automatically locate and eliminate the most frequently encountered phase conflict that is associated with three way intersections in phase edge PSM designs.

It is another object of the invention to provide an automatic CAD routine that locates and widens one leg of a three way intersection to avoid phase conflicts.

According to the invention, a method is provided that uses CAD and design rule checking techniques to locate and resolve design conflicts prior to actually executing the very time consuming phase shift mask design. More particularly, the invention locates and resolves the most frequent phase shift mask design conflict encountered on the most critical level of VLSI chip designs. This design conflict is a three way or "T" intersection at minimal dimension, encountered frequently on gate level designs. The original circuit design is manipulated prior to or as part of the design rule checking. This allows the verification of the manipulations made prior to submission of the design to the mask layout and mask data preparation group.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 11:
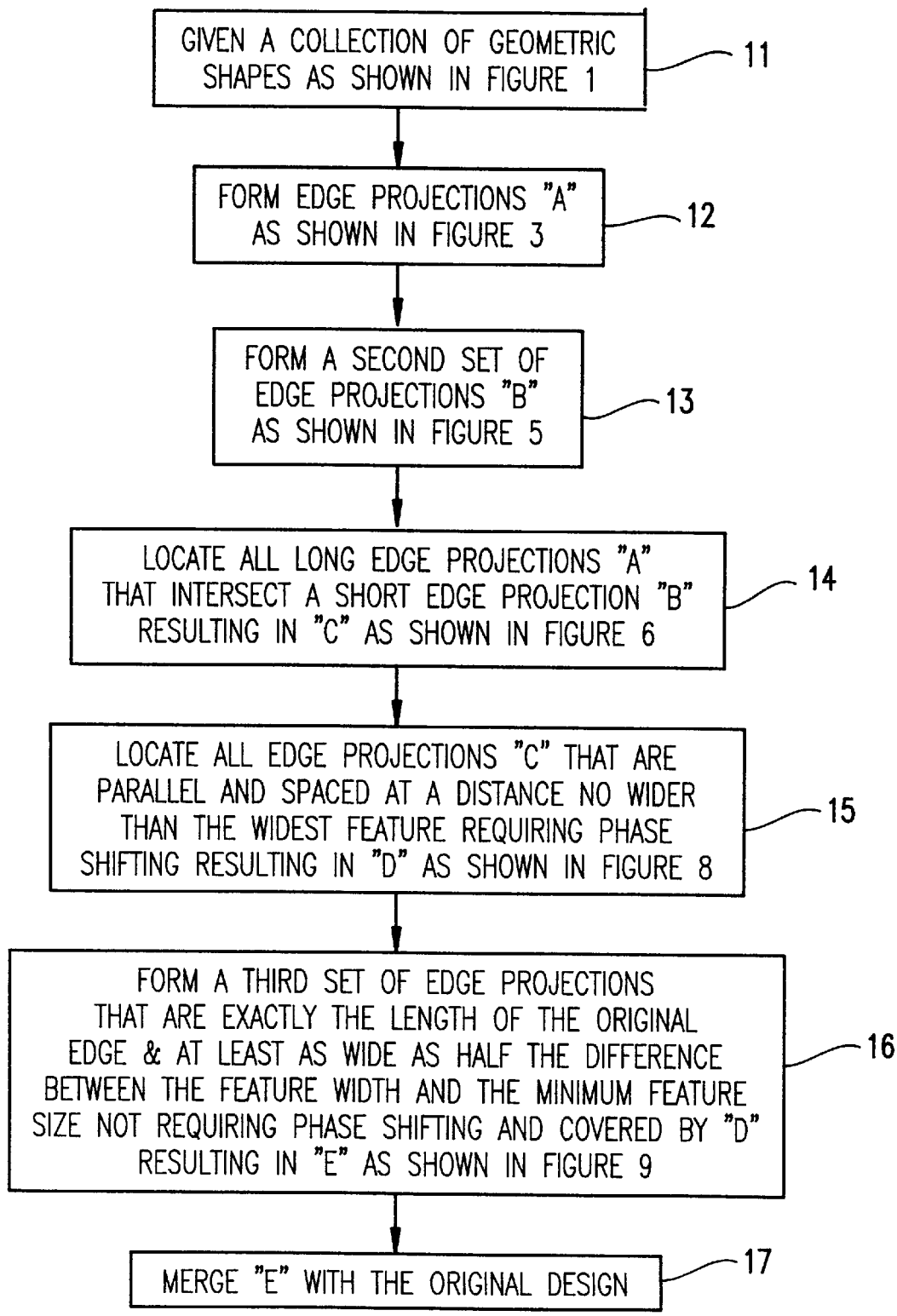
FIG. 11 is a flow diagram of the computer implemented method according to the invention.

Referring now to the drawings, and more particularly to FIG. 11, there is shown a flow diagram which illustrates the logic of the inventive method concerned with elimination of design conflicts in a phase shifted mask design from a typical polygate structure in a VLSI circuit design. The method preferably can be implemented with a computer program for the automatic elimination of design conflicts in a phase shifted mask design from a typical polygate structure in a VLSI circuit design. With reference to the concepts and principles of the present invention as described herein, the source code for the program can be written by one of skill in a computer language compatible with a particular CAD program in which it is to be implemented.

Figure 1:
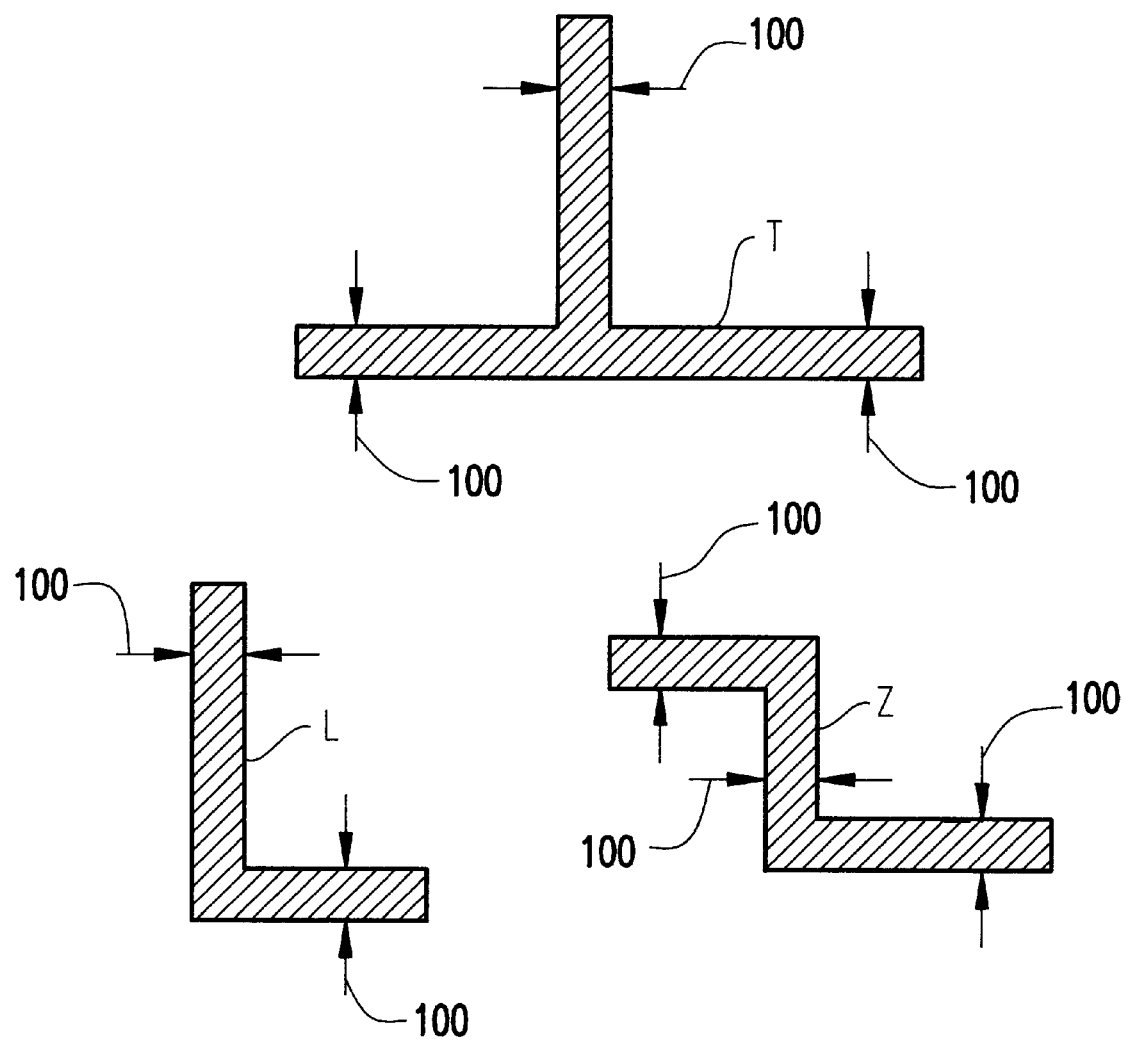
FIG. 1 is a plan view of a collection of geometric shapes at an arbitrary critical dimension.

The process begins in function block 11 in which an original design is decomposed into a collection of geometric shapes at an arbitrary critical dimension, as shown in FIG. 1. FIG. 1 shows a sample of basic geometric configurations (e.g., "T", "L", and "Z") commonly found in IC layouts. A dimension of the rectangles used to form these geometric configurations corresponds to a feature width. The present invention is based on the premise that even relatively complex chip designs can be reduced to rectangles that form a small variety of bends, jogs, intersections, and so forth. The present inventors have found it useful and convenient to classify these basic geometry by letters of the alphabet that they most resemble, but it can be appreciated that this labeling per se is arbitrary.

Figure 17A:
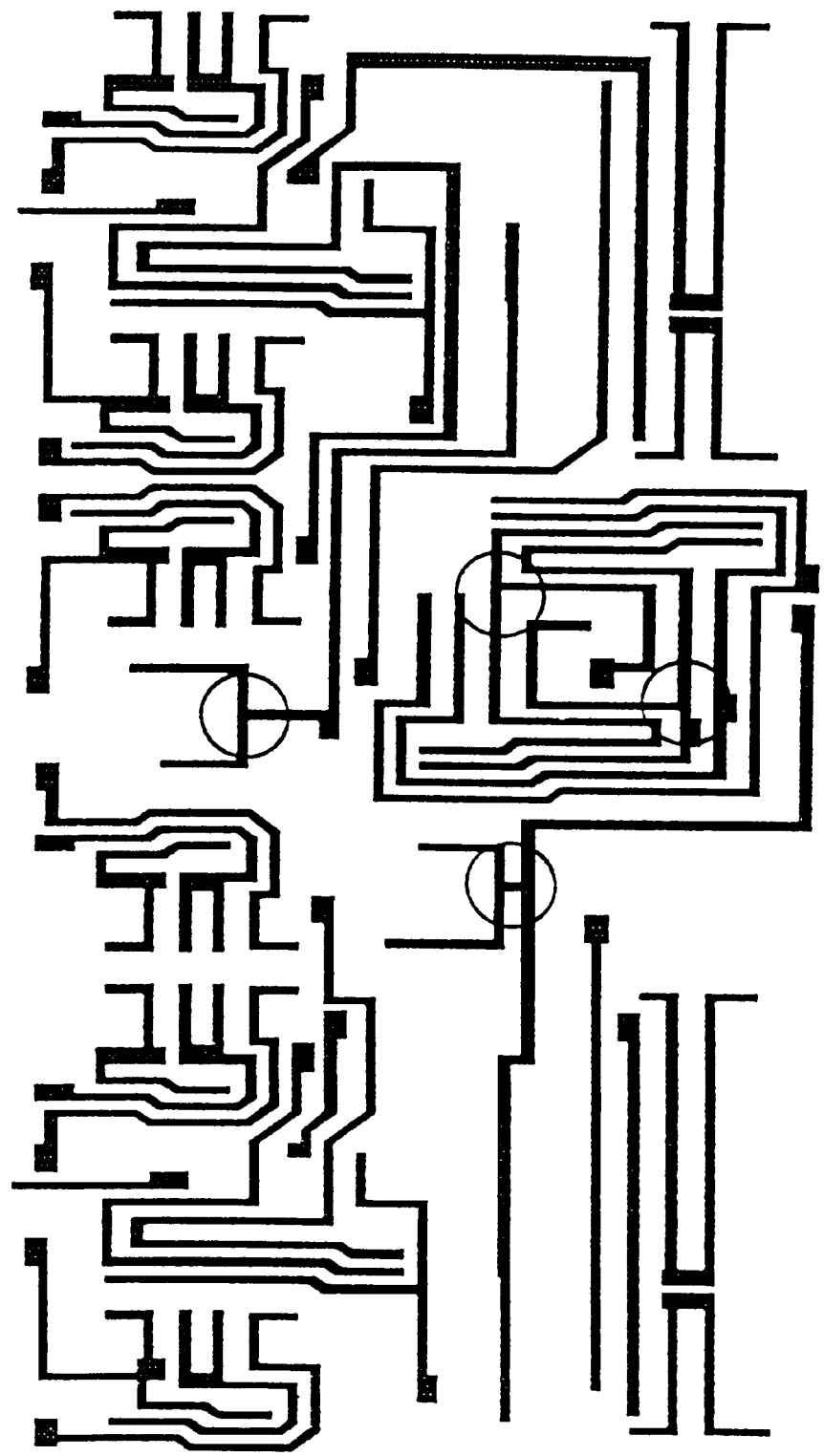
FIGS. 17A and 17B are respectively plan views of a small sample of a realistic gate level design and the correction shapes applied to the design by the present invention.

The process begins in function block 11 in which an original design at an arbitrary critical dimension is input (or loaded) into the routine. Rather than demonstrating the inventive routine on a complex chip design, such as shown in FIG. 17A, the utility and application of the invention is demonstrated below on several less-complex designs for sake of simplifying the illustration of the invention. That is, for the purpose of illustrating the invention, a complex chip design can be reduced to set of basic geometries, some of which are shown in FIG. 1 (e.g., "T", "L" and "Z" shapes), which represent constituent shapes of a more complex circuit design such as shown in FIG. 17A. In applying the inventive routine to a real chip design, the inventive routine as illustrated on these elementary shapes is replicated on all the like constituent geometric shapes composing the circuit design as a whole, such as shown in FIG. 17A.

Figure 2:
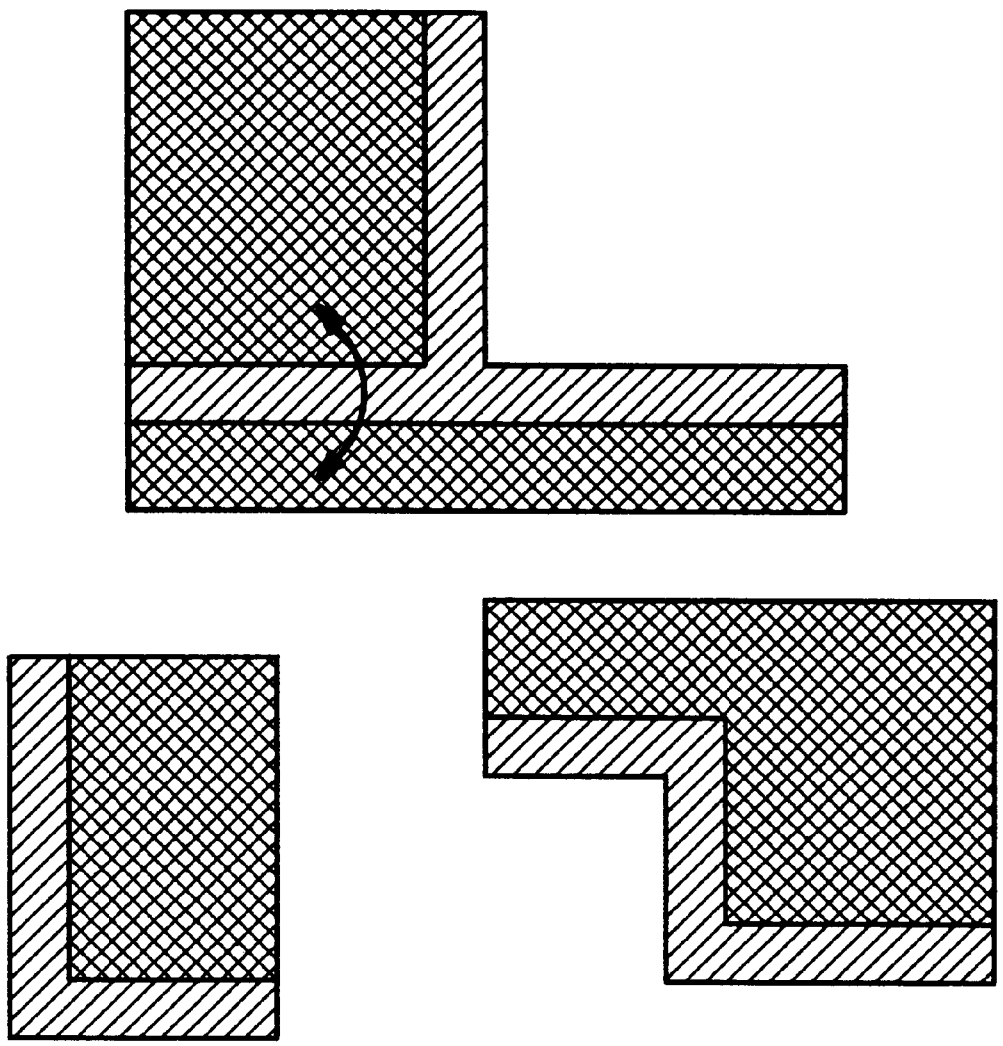
FIGS. 2 to 10 are plan views illustrating the process of eliminating the design conflict as illustrated in FIG. 2.

FIG. 2 indicates the phase conflicts encountered in "T"'s. The shaded areas are phase shifted regions. All narrow lines would have to have a clear area on one side and a shaded area on the opposite side. The phase conflict is shown by the double arrow.

Figure 3:
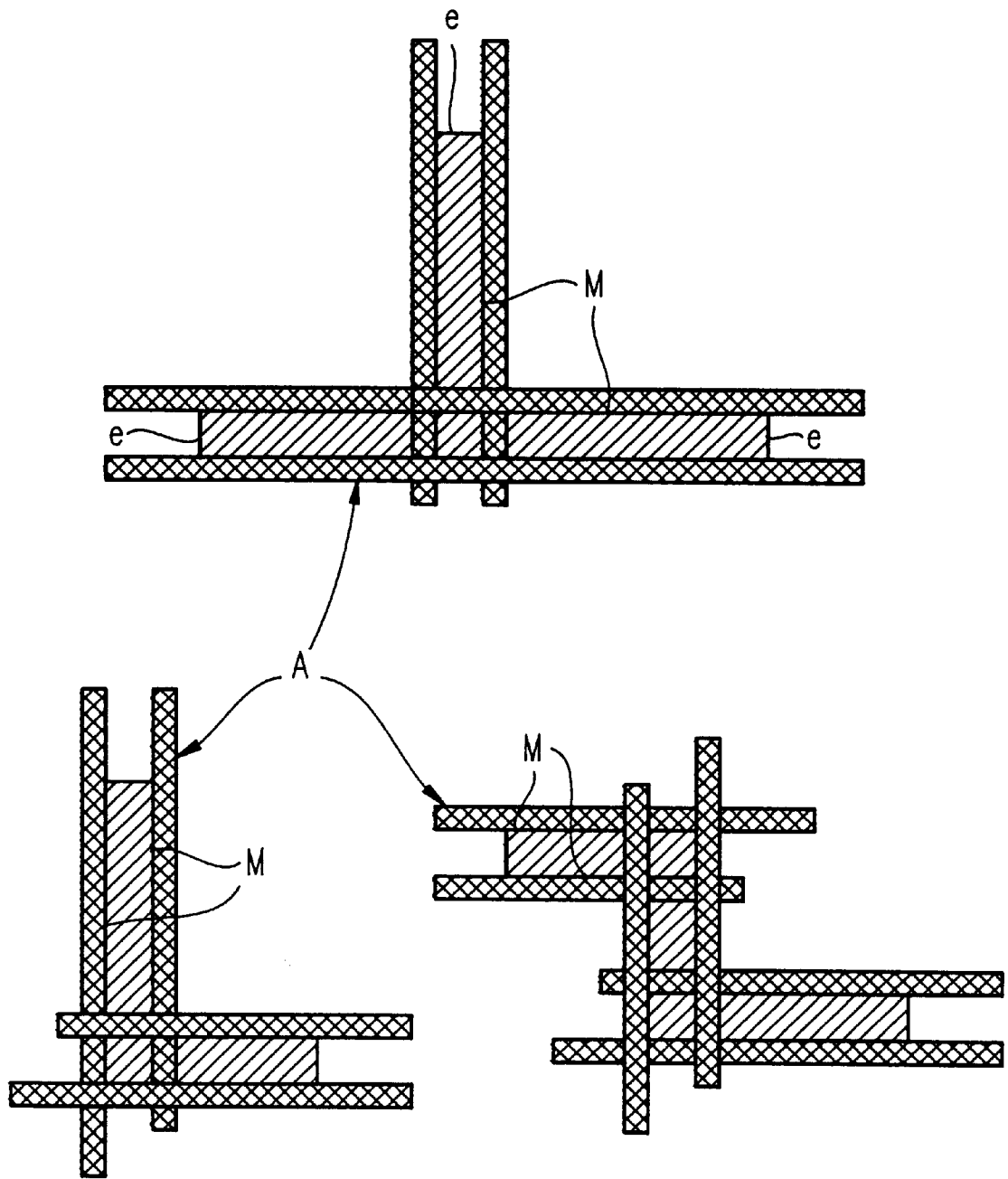

In the next step of the inventive process, as indicated in function block 12 (FIG. 11), long edge projections "A" are generated as shown FIG. 3 using the collection of geometric shapes shown in FIG. 1. Specifically, with reference to FIG. 3, rectangular-shaped long edge projections "AA" are formed outside and bordering every major edge "M" of the geometric shapes such that the shape of the edge protection "AA" is longer than the original major edge "M" a distance equal to the width of the widest feature requiring phase shifting.

As a result, every major edge M has an elongated rectangle drawn next to and just outside of it, as shown in FIG. 3. Similar applications of projections are applied to the "Z" and "L" shapes.

As illustrated in FIG. 3, the small ends "e" of the geometric shapes (i.e., "T", "Z", and "L") are not bordered by any projection running parallel to the direction of extent of the ends "e". However, it must be understood that it is not essential to eliminate line edges "e". The inventive routine would work also with them included, but they are omitted from the illustration here to simplify the figures. The line edges "e" are easily eliminated by sorting out all edges of a length less than or equal to the critical line width prior to forming the edge projections (i.e., the routine throws out all the short, stubby edge projection shapes along edges "e").

Figure 4:
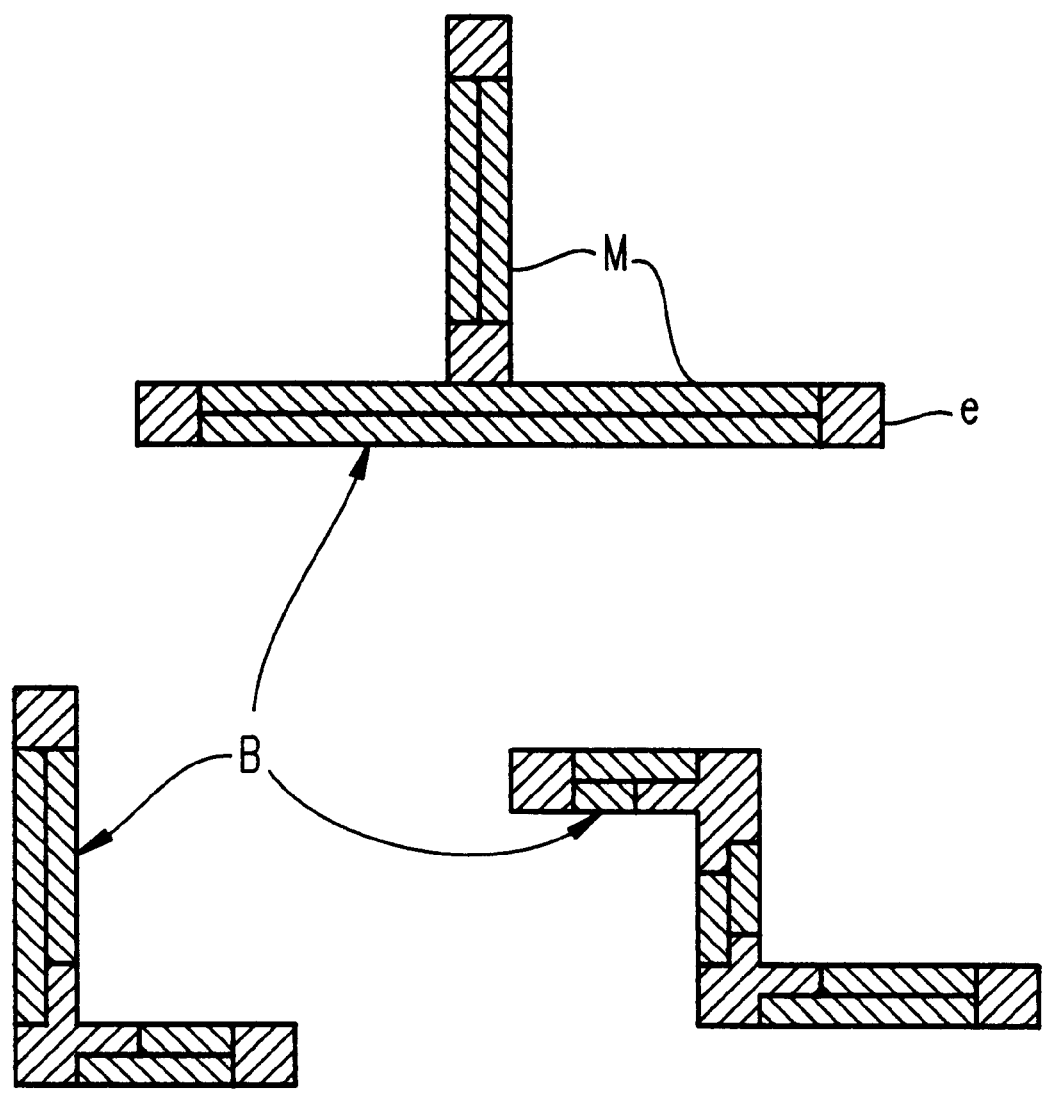

Next in the process, as described in function block 13 (FIG. 11), a second set of rectangular-shaped short edge projections "B" are formed just inside and bordering every major edge "M", as shown in FIG. 4, such that the edge projection shape is shorter than the original end edge "e" a distance based on the width of the widest feature requiring phase shifting. As a result, every major edge has an shortened rectangle drawn next to and just inside of it, as shown in FIG. 4.

Figure 5:
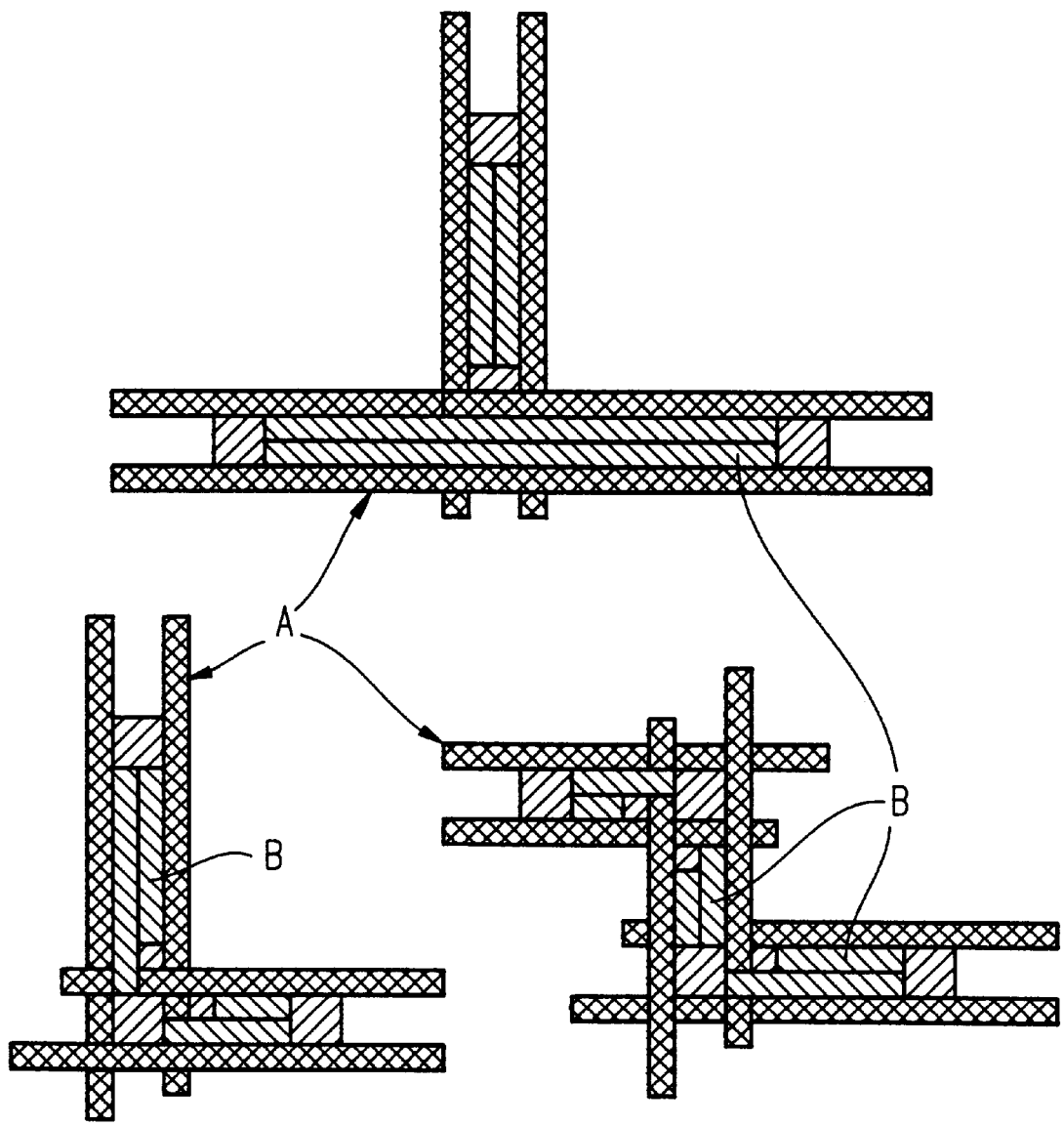

FIG. 5 shows a composite of the original figures plus elongated edge projections "A" and shortened edge projections "B".

Figure 6:
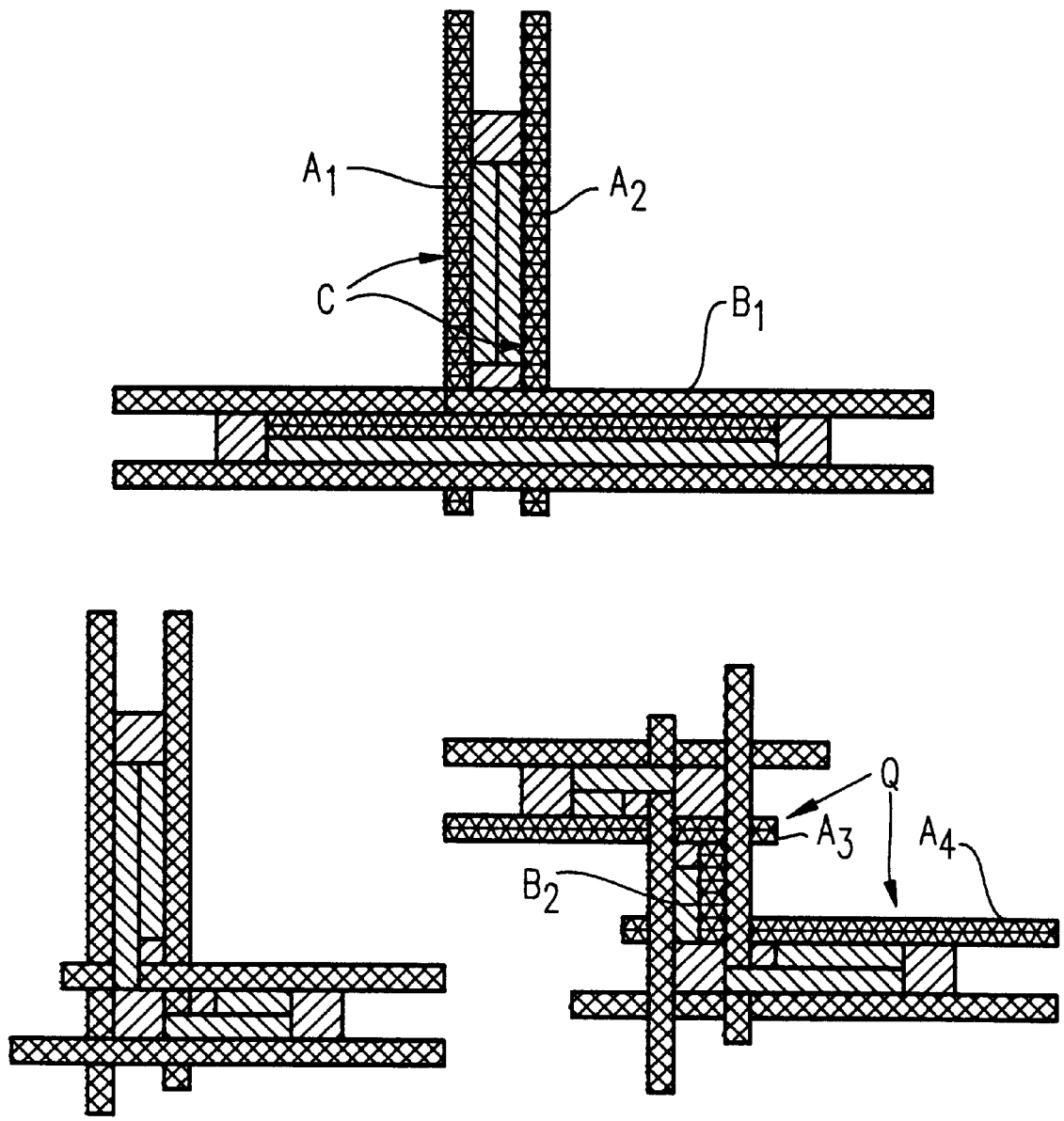

Then, as described in function block 14 of the process flow, elongated edges $A_1$ and $A_2$ (indicated in dark fill) are located in the "T" based on their meeting the criterion that they are the elongated edges that contact and intersect each other through a shortened edge $B_1$ (also in dark fill), respectively, resulting in "C". Elongated edges $A_1$ and $A_2$ and "C" are shown in FIG. 6. Also, in the "Z", solid elongated edges $A_3$ and $A_4$ (in dark fill) can be identified, which are the elongated edges that contact and intersect each other through a shortened edge $B_2$ (also in dark fill), respectively, resulting in "Q".

Figure 7:
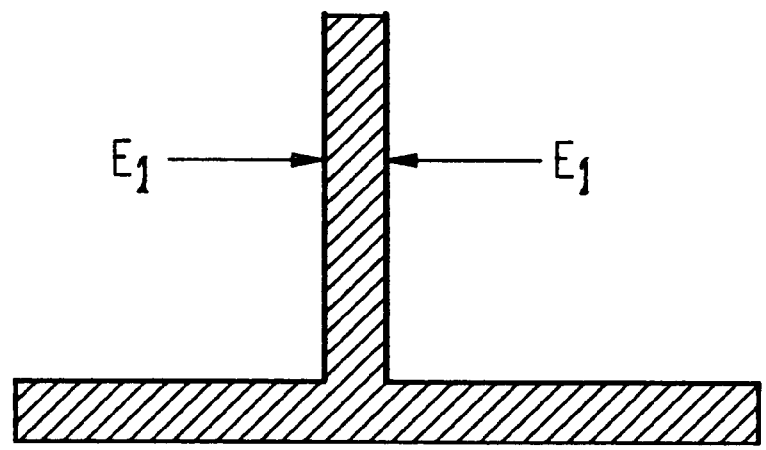
Figure 7:
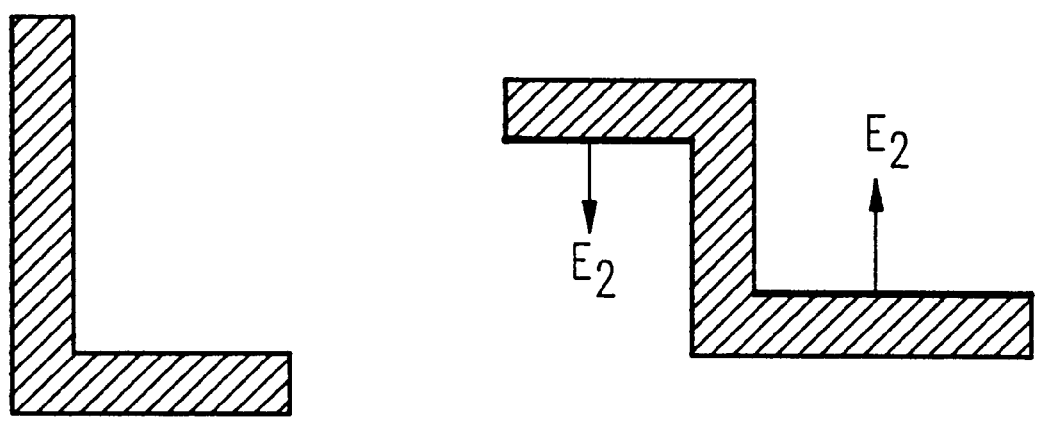
Figure 8:
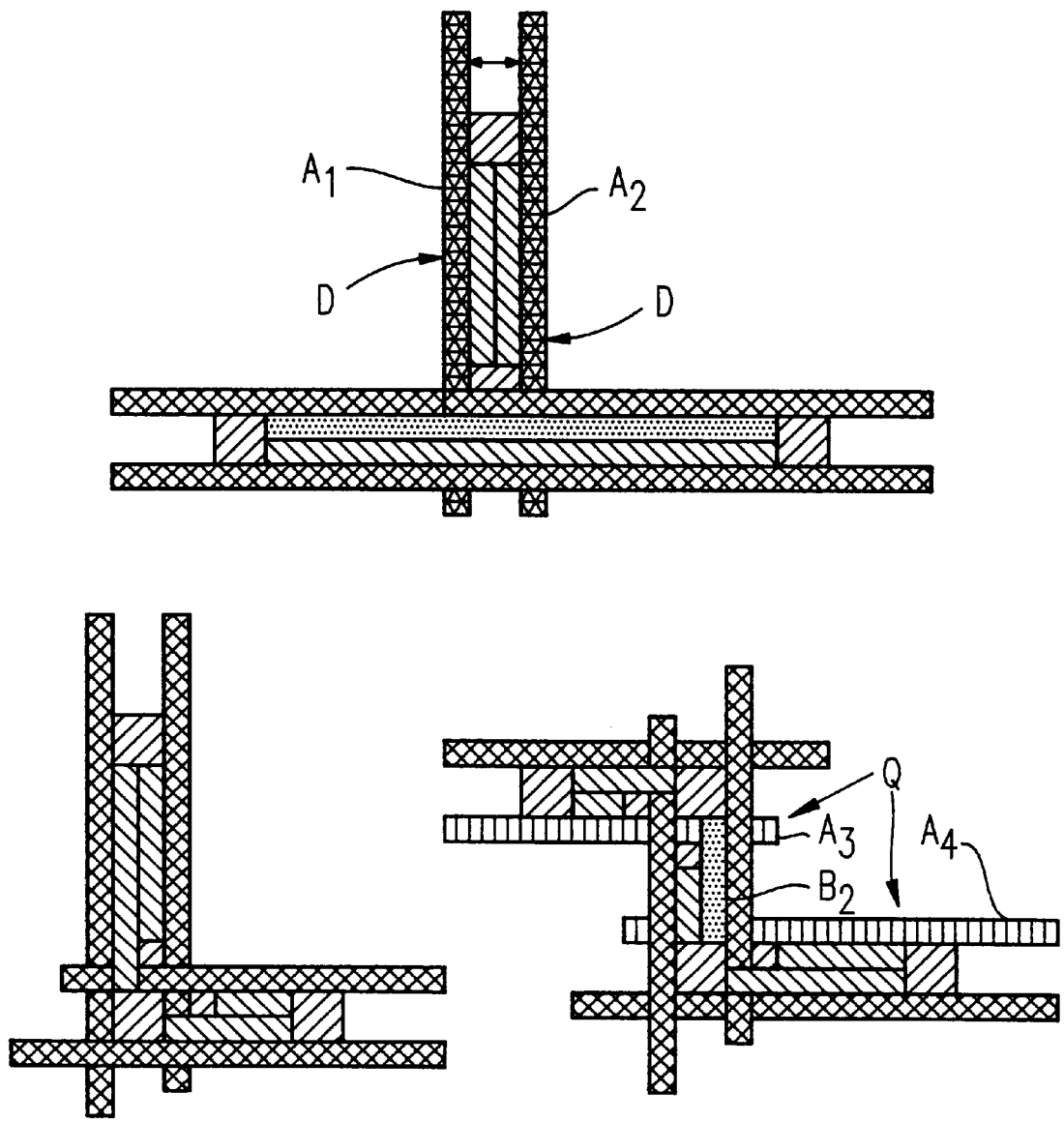

FIG. 7 is a simplified view showing, in isolation, the shape edges $E_1$ in the "T" and shape edges $E_2$ that were located in function block 14. The edges $E_1$ of the "T" are distinguished from edges $E_2$ in the "Z" by the fact that they are parallel and opposing across the original designed shape. This situation only arises in "T"s. Further according to the next process step of function block 15, all edge projections "C" are located that are parallel and spaced at a distance no wider than the widest feature requiring phase shifting, resulting in "D", as shown in FIG. 8. At this juncture of the routine, the "T"s have been located. The following steps concern elimination of the "T"s.

Figure 9:
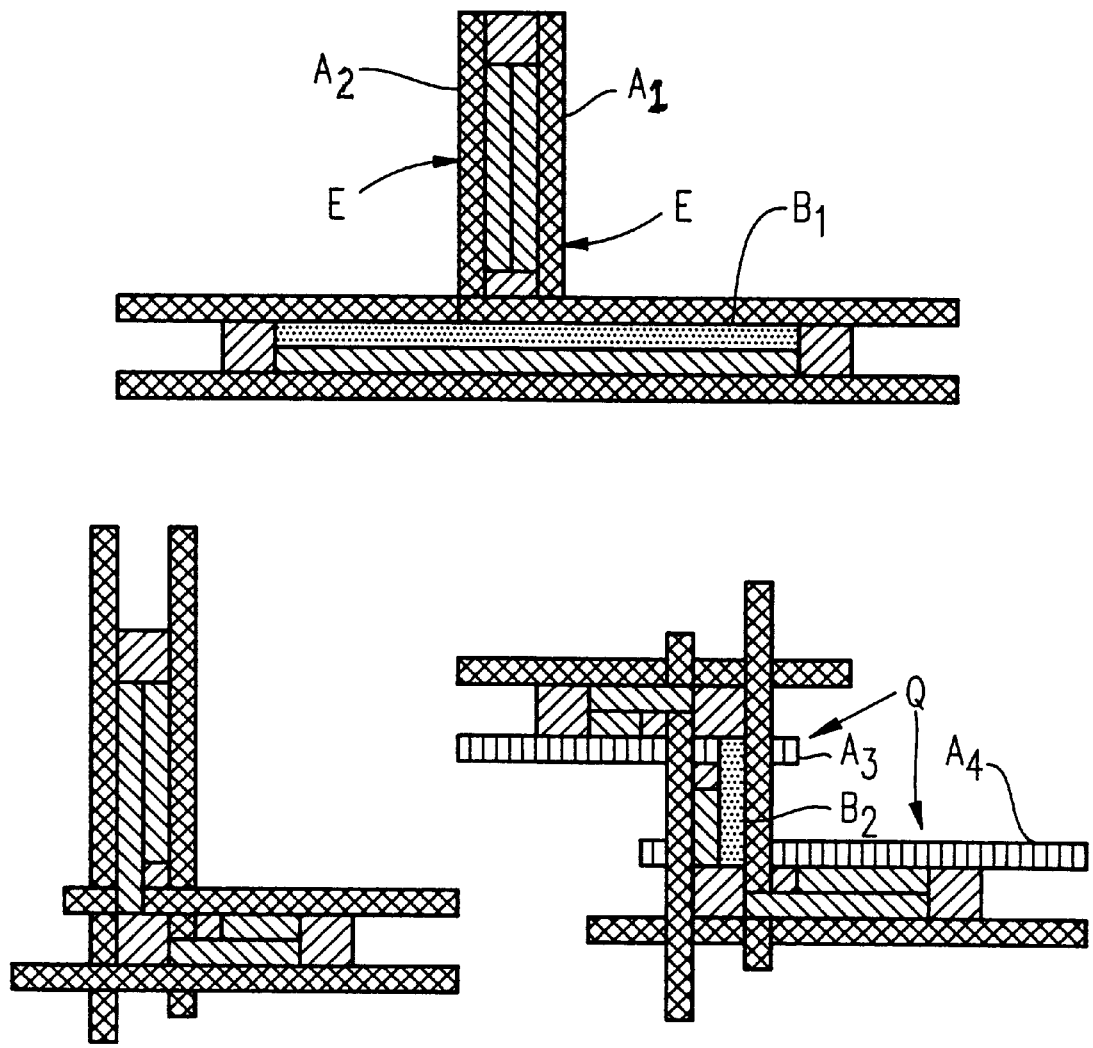

Next, in function block 16, a third set of edge projections are formed from the "D" features that are exactly the same length of the original edge of the "T" shape, and at least as wide as half the difference between the present feature width and the minimum feature size not requiring phase shifting, resulting in "E", as shown in FIG. 9.

Figure 10:
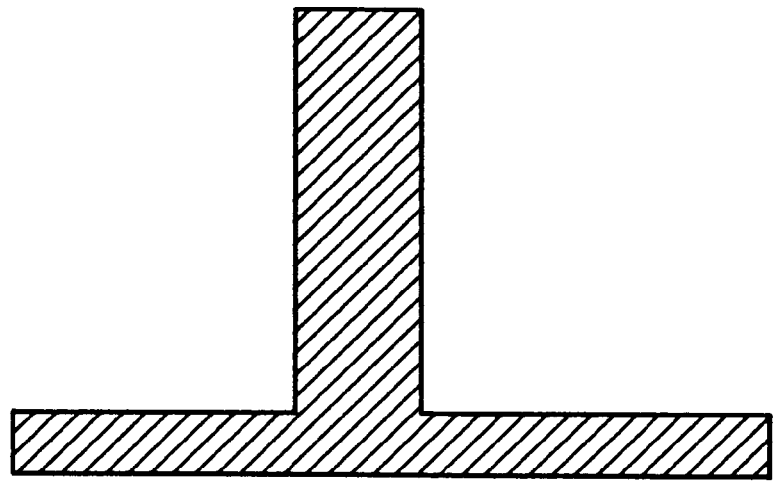
Figure 10:
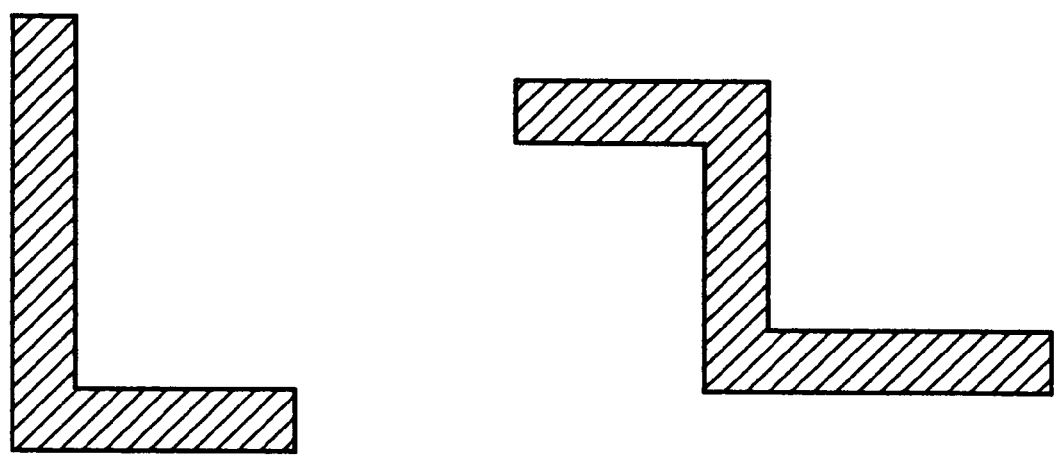

Finally, in function block 17, "E" is merged with the original circuit design to automatically obtain a fully phase shiftable design. In the alternative, "E" is presented to the designer as a means of conflict reporting. The resulting corrected structure is shown in FIG. 10 with the corrections shown in dark fill.

Figure 12:
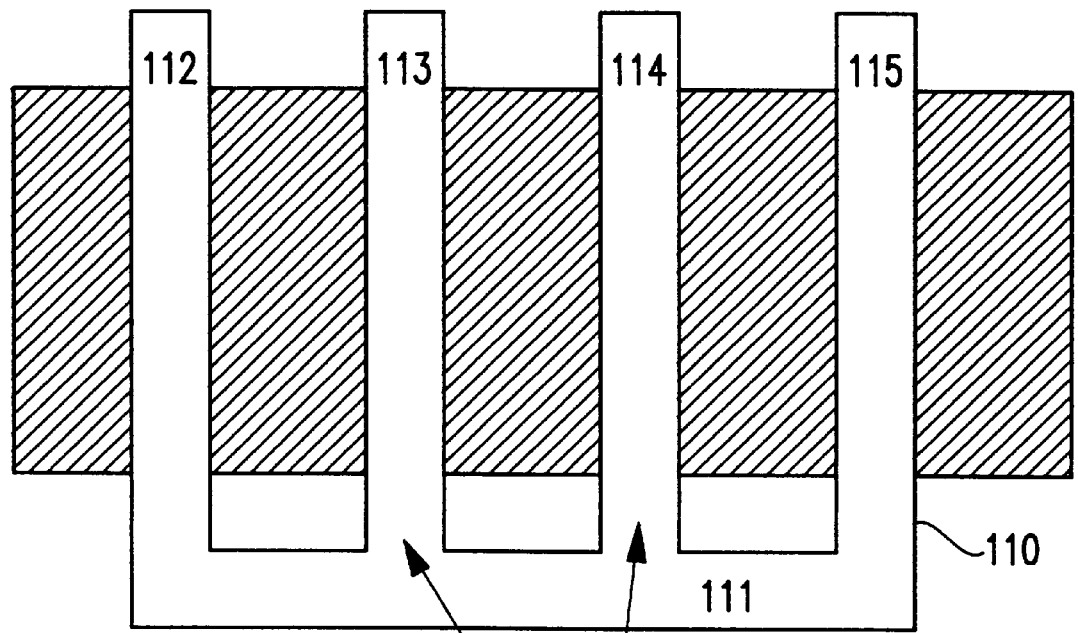
FIGS. 12–15 are plan views illustrating the process of eliminating the design conflict as illustrated in FIG. 12.

FIG. 12 shows another example of a basic circuit component that could exhibit the "T" problem. In this comb structure 110, for example, multiple parallel transistors are turned on via "tines" 112–115 through a common base wire 111. The gate conductor level of the transistor is shown in the bounded white area while the diffusion area that defines the section of the design where a transistor is formed, is shown cross-hatched. The problematic 3-way intersections ("T"s) 30 are pointed out.

Figure 13:
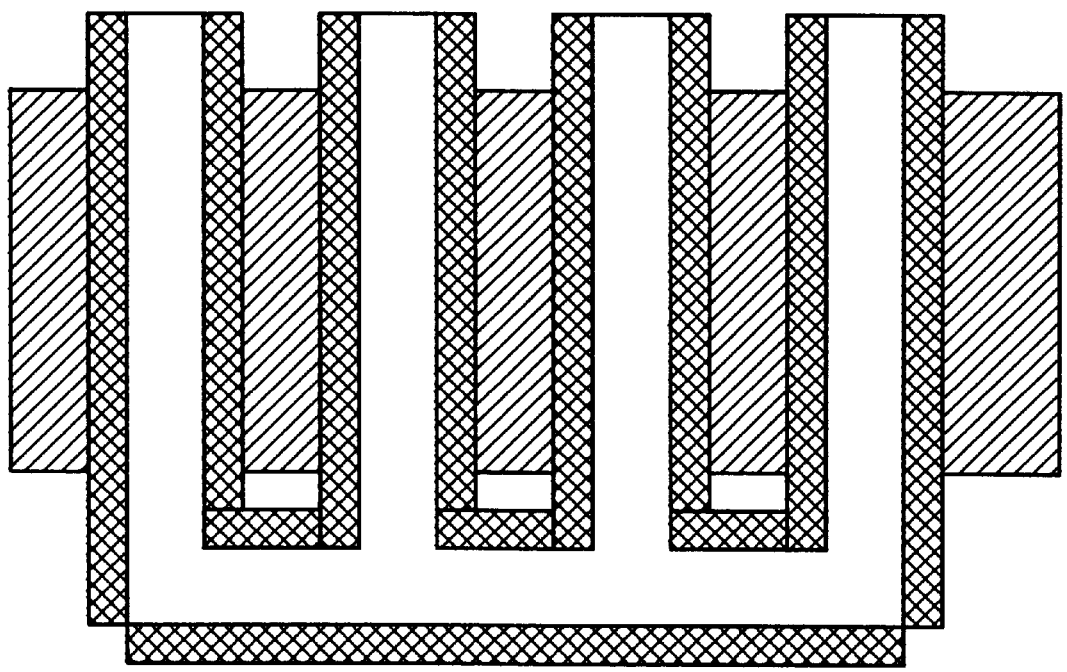

FIG. 13 shows that once the structure of FIG. 12 is identified as containing at least one "T", the phase shift conflict is removed by identifying non-critical parts of the structure and widening them to a dimension that does not require phase shifting. One example of how to do this is shown in FIG. 13, starting with edge projections that are formed along all edges of the design as indicated by the crosshatched areas.

Figure 14:
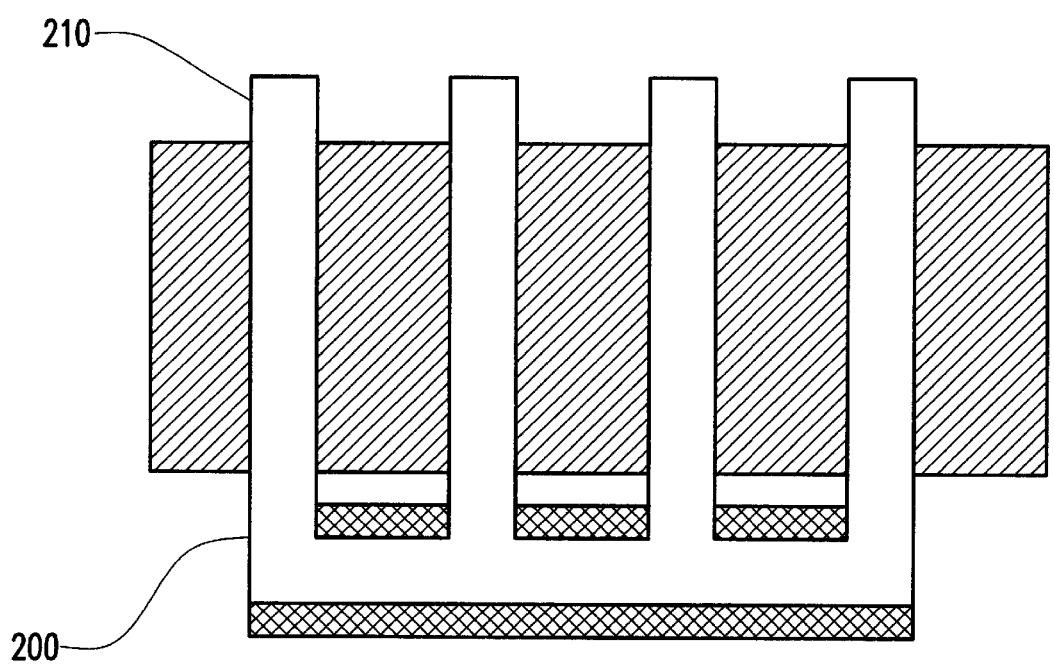

Next, FIG. 14 shows removing the edge projections that cross the critical diffusion region to leave edge projections that widen the original structure only in non-critical regions. While exemplified in this manner, other sorting methods also could be used to eliminate edge projections along critical edges of the design using known design rule checking techniques. The term "critical" is used here to describe features that are narrower than the useful resolution limits of the lithography process without phase shift assistance. For instance, FIG. 14 shows a "comb" 200 structure consisting of a wide horizontal bar that can be replicated in standard lithography process without the need for phase shift resolution enhancement and narrow vertical prongs 210 that, by virtue of their dimension, are deemed "critical" to the PSM design routine. These narrow "critical" features are, in general, the one most critical to the electrical functionality of the resulting chip. For example, the comb structure used as an example can be found in the gate level of chip designs whenever it is necessary to turn on a series of gates (i.e., prongs) at the same time by applying a voltage to the base of the comb.

Figure 15:
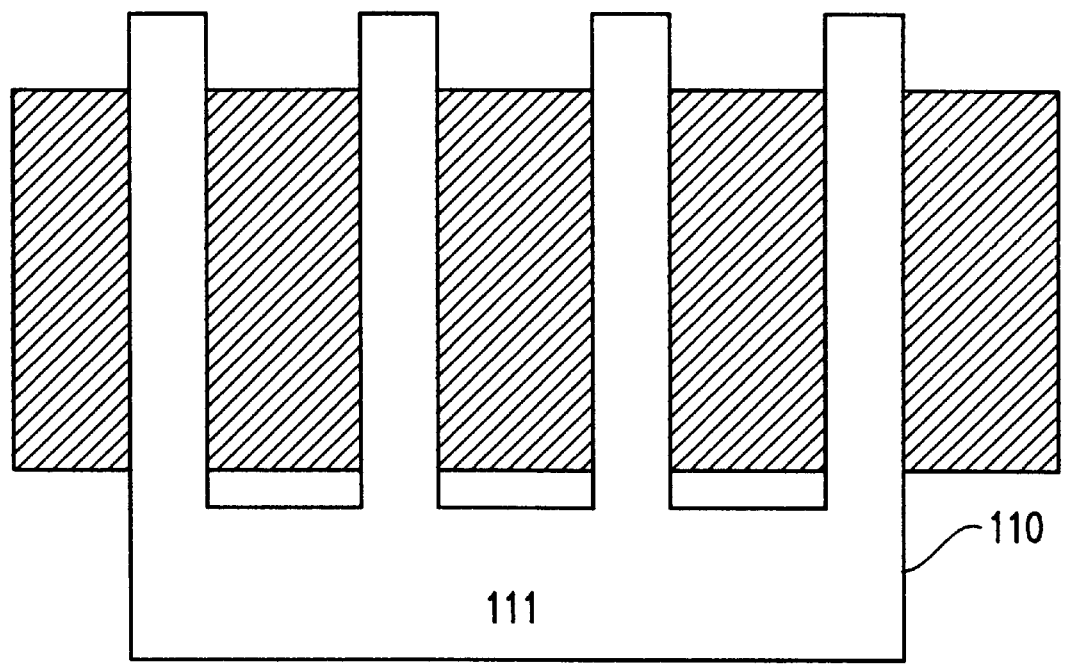

FIG. 15 shows the final corrected structure formed by merging the non-critical edge projections with the original design. As shown, feature 111 is effectively widened.

Figure 16A:
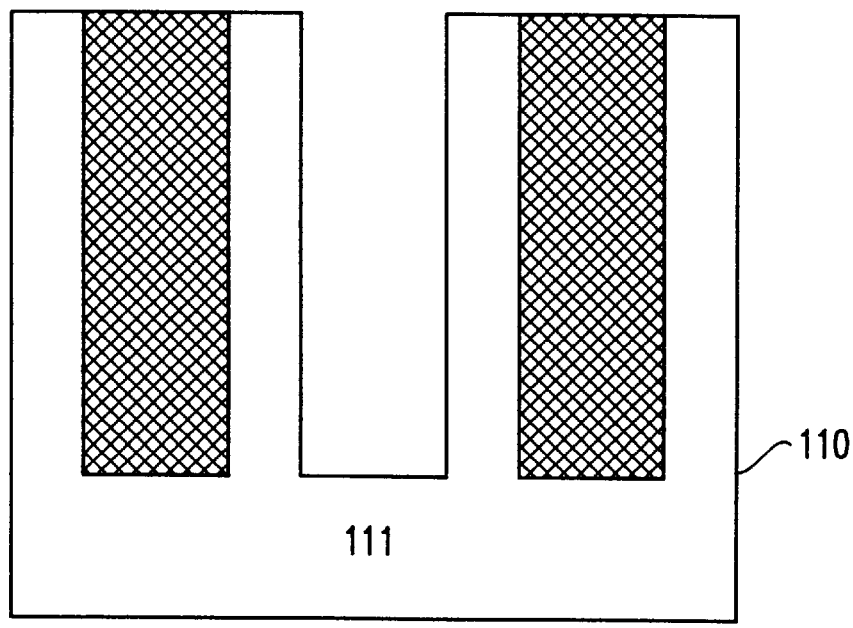
FIGS. 16A and 16B shows an example of the possible phase assignments after the T-correction (top) and without the T-correction (bottom) for the design conflict as illustrated in FIG. 10.
Figure 16B:
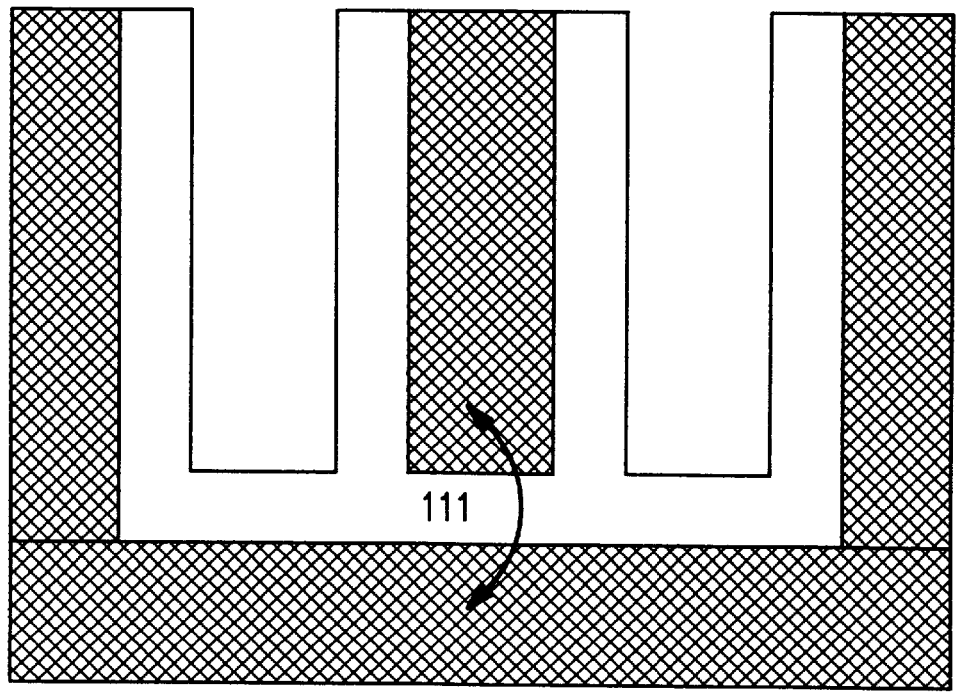

FIGS. 16A and 16B shows an example of the possible phase assignments after the T-correction (top) according to the process of the present invention and without the T-correction (bottom). Since the base 111 of the comb structure 110 is widened in FIG. 16A, it no longer requires the phase transition across it, avoiding the design conflict associated with"T"s. Phase shifted areas are shown in crosshatching in FIGS. 16A and 16B. The phase conflict remaining in the structure of FIG. 16B lacking the T-correction of the invention is indicated by the double arrow.

Figure 17B:
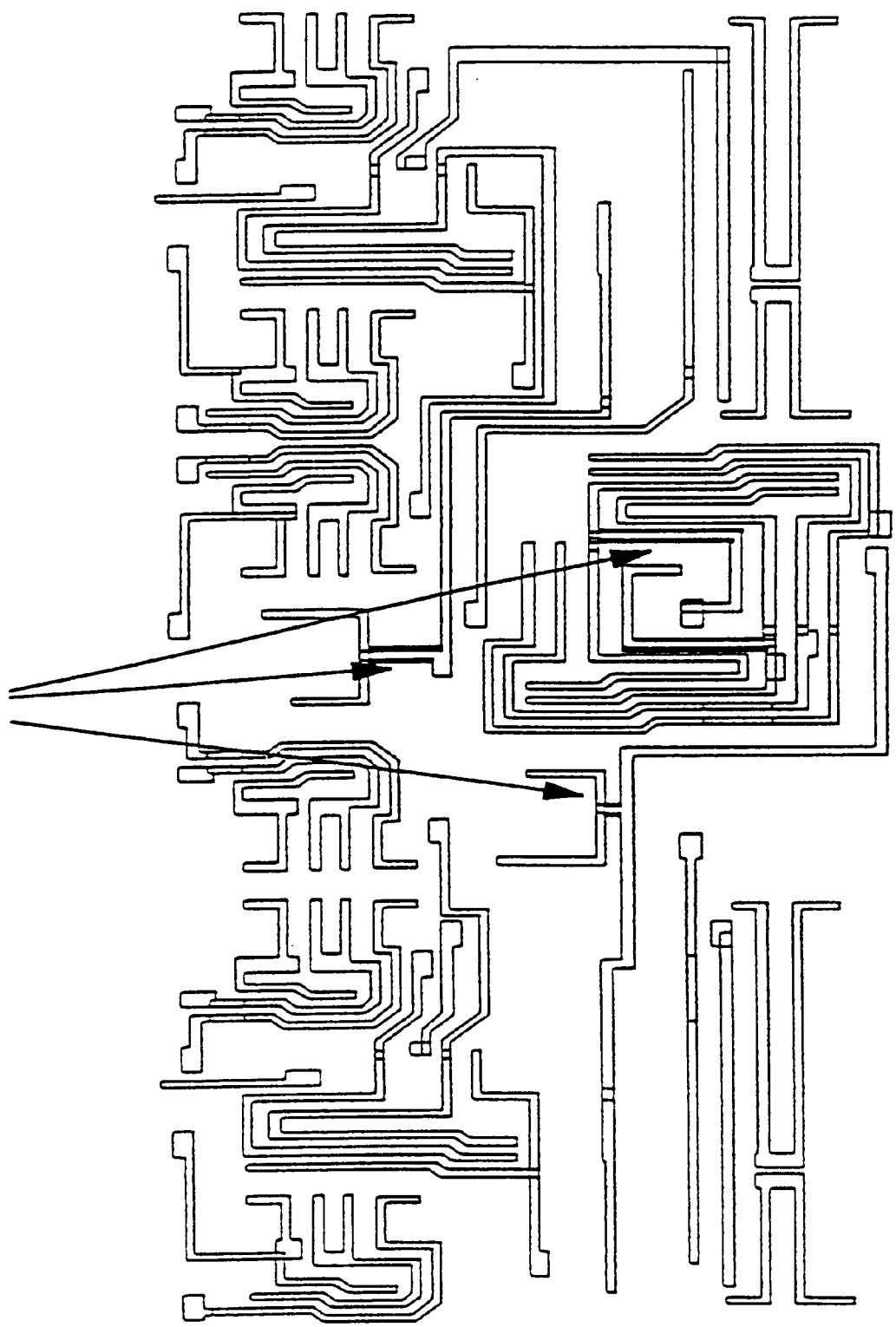

FIG. 17A shows a small sample of a realistic gate level design, including angled lines and complex wiring. In FIG. 17A, four design conflicts in the form of three way or "T" intersections are circled. FIG. 17B shows the correction shapes applied to the design by the present invention to eliminate three way intersections at minimum dimension. Corrections are indicated in FIG. 17B in dark fill. The shapes generated as part of the inventive routine can be used to visually report errors to designers and assist in locating the problematic design in a complex dataset.

The present invention thus provides for automatic location of problematic intersections in a mask design where any "T" overlap is eliminated by widening of one leg of a "T" (i.e., a three-way intersection) at minimal dimension, such as encountered frequently on gate level designs. The inventive method manipulates the original circuit design prior to or as part of the design rule checking. This permits mask designers to verify the manipulations prior to implementation of the mask layout. The invention permits elimination of T-conflicts without impact to the electrical performance of the chip by widening only non-critical "legs" in the geometric shapes constituting the design circuit pattern. The inventive method is applicable to elimination of design conflicts in the important light field design milieu in which a phase has to be assigned to the background of a shape, not the shape itself. The inventive method takes advantage of being able to locate and resolve design conflicts prior to and without having to execute the very time consuming phase shift mask design, and extract electrical design rule verification, to make a very cost effective correction. Moreover, the inventive method is advantageous in that it is hierarchical and non-iterative in nature, and it also allows for error reporting.

CAD and design rule checking techniques are used to implement the inventive routine. In a preferred embodiment, the generation of the mask shapes described herein are implemented in a hierarchical CAD dataset using a hierarchical shapes processing tool such as described in U.S. Pat. Nos. 5,481,473 and 5,497,334, which are incorporated herein by reference, running on a workstation such as an IBM RISC/6000. It can also be implemented in other commercially available CAD systems, such as the CADENCE layout editor by Cadence Design Systems, Inc., running on any supported workstation.

Additionally, the inventive method can be used as part of an advanced DRC deck to verify correctness of a given design, such as could be coded for the tool named DRACULA™ available from Cadence Design Systems Inc., or Avant!'s VERICHECK™ DRC tool.

Since it is possible that the final CAD data conversion for the phase edge PSMs will be supported by the mask making facility, not the original chip designer, it is possible to include the layout verification routine as part of the mask writer data preparation and fracturing operation, implemented on, for example, Transcription Enterprises CATS (computer aided transcription system) package.

While the inventive method has been exemplified herein for locating and resolving three way intersection design conflicts in phase edge phase shifted mask designs used in the manufacture of VLSI circuits, it is to be understood that the invention is generally applicable to locating three way intersection design conflicts, for instance, as also applied to road maps, architectural CAD plans, and so forth.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of locating and resolving three way intersection design conflicts in computer-generated patterns formed of a collection of geometric shapes, comprising the steps of:

(1) forming a first set of edge projections having projection shapes which are located outside and bordering each major border edge of geometric shapes in an original pattern, wherein each edge projection shape in said first set is longer than a length of a bordering major edge by a distance equal to a width of a widest feature in a corresponding one of said geometric shapes requiring phase shifting;

(2) forming a second set of edge projections having projection shapes on said geometric shapes, wherein said second set of edge projections are formed in side and bordering each of said major border edge, wherein each edge projection shape in second set is shorter than a bordering major edge by a distance equal to a width of a widest feature in a corresponding one of said geometric shape requiring phase shifting;

(3) locating all of said first set of edge projections from step (1) that intersect an edge projection from step (2);

(4) locating all edge projections among those identified from step (3) that are parallel and spaced at a distance no wider than a widest feature requiring phase shifting;

(5) forming a third set of edge projections from among the projections identified from step (4) that are exactly a length of a major border edge and at least as wide as half the difference between a feature width and a minimum feature size not requiring phase shifting; and (6) merging the projections identified in step (5) with the original pattern.

2. A computer implemented method of locating and resolving three way intersection design conflicts in computer-generated patterns formed of a collection of interconnected geometric shapes, said shapes defined by major border edges and ends that intersect said major border edges, comprising the steps of:

forming a first set of edge projections "A" having projection shapes outside and bordering each of said major border edges of geometric shapes in an original pattern, wherein each edge projection shape in said first set is longer than a length of a bordering major edge by a distance equal to a width of a widest feature in a corresponding one of said geometirc shapes requiring phase shifting;

forming a second set of edge projections "B" having projection shapes on said geometric shapes, wherein said second set of edge projections "B" are formed inside and bordering each of said major border edges, wherein each edge projection shape in said second set is shorter than a bordering major edge by a distance equal to a width of a widest feature in a corresponding one of said geometric shapes requiring phase shifting;

locating all of said first set of edge projections "A" that intersect an edge projection "B" resulting in projections "C";

locating all edge projections "C" that are parallel and spaced at a distance no wider than a widest feature requiring phase shifting resulting in projections "D";

forming a third set of set of edge projections fro projections "D" that are exactly a length of a major border edge and at least as wide as half the difference between a feature width and a minimum feature size not requiring phase shifting resulting in projections "E"; and merging projections "E" with the original pattern.

3. A method of locating and resolving three way intersection design conflicts in phase edge phase shifted mask designs used in the manufacture of VLSI circuits, comprising the steps of:

decomposing an original circuit design into a collection of geometric shapes at an arbitrary critical dimension, said geometric shapes being defined by major edges and ends that intersect said major border edges;

forming a first set of edge projections "A" having projection shapes outside and bordering each of said major edges of said geometric shapes, wherein each edge projection shape of said first set of projections "A" is longer than the length of the bordering major edge by a distance equal to width of a widest feature in said geometric shape requiring phase shifting;

forming a second set of edge projections "B" having projection shapes on said geometric shapes, where said second set of edge projections "B" are formed inside and bordering each of said major edges and wherein said edge projection shapes of said edge projections "B" are shorter than the bordering major edge by a distance equal to the width of the widest feature in said geometric shape requiring phase shifting;

locating all of said first set of edge projections "A" that intersect an edge projection "B" resulting in "C";

locating all edge projections "C" that are parallel and spaced at a distance no wider than a widest feature requiring phase shifting resulting in projections "D";

forming a third set of edge projections from projections "D" that are exactly the length of a major edge and at least as wide as half the difference between a feature width and a minimum feature size not requiring phase shifting resulting in projections "E"; and merging projections "E" with the original circuit design.

4. The method of claim 3, wherein said ends of said geometric shapes intersect said major edges at right angles.

5. The method of claim 3, wherein said geometric shapes include a T shape.

6. The method of claim 3, wherein said long edge projections "A" comprise rectangular shapes.

7. The method of claim 3, wherein said short edge projections "B" comprise rectangular shapes.

8. The method of claim 3, wherein said three way intersections are located using CAD and DRC techniques.

9. The method of claim 3, further comprising using an advanced DRC deck to verify correctness of a given design.

10. The method of claim 3, wherein said shapes are generated as part of a routine further including display means to visually display errors and assist in locating three way intersections.

11. The method of claim 3, wherein said pattern is used in a light field mask design.

* * * * *